United States Patent
Wallach et al.

(10) Patent No.: US 6,662,168 B1
(45) Date of Patent: Dec. 9, 2003

(54) CODING SYSTEM FOR HIGH DATA VOLUME

(75) Inventors: Eugene Wallach, Haifa (IL); Aviad Zlotnick, Mizpe Netofa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/575,014

(22) Filed: May 19, 2000

(51) Int. Cl.[7] .............................................. G06F 15/18
(52) U.S. Cl. .............................. 706/14; 706/45; 706/11
(58) Field of Search ............................ 706/14, 45, 11; 707/6

(56) References Cited

U.S. PATENT DOCUMENTS 5,371,807 A   12/1994   Register et al. ............. 382/159
6,125,362 A * 9/2000   Elworthy ...................... 707/6

OTHER PUBLICATIONS www.inferencegroup.com.au (web pages), pp. 1–6.

\* cited by examiner

Primary Examiner—Anil Khatri
Assistant Examiner—Joseph P. Hirl
(74) Attorney, Agent, or Firm—Darby & Darby

(57) ABSTRACT

A method for automated coding of a text phrase relative to a catalog of codes. The method includes finding a plurality of the codes that are candidates for coding of the phrase and identifying a category to which one or more of the candidate codes belong. The phrase is conveyed together with the one or more candidate codes in the identified category to a human operator specialized in the identified category, for verification by the operator of one of the candidate codes in the category for assignment to the phrase.

26 Claims, 4 Drawing Sheets

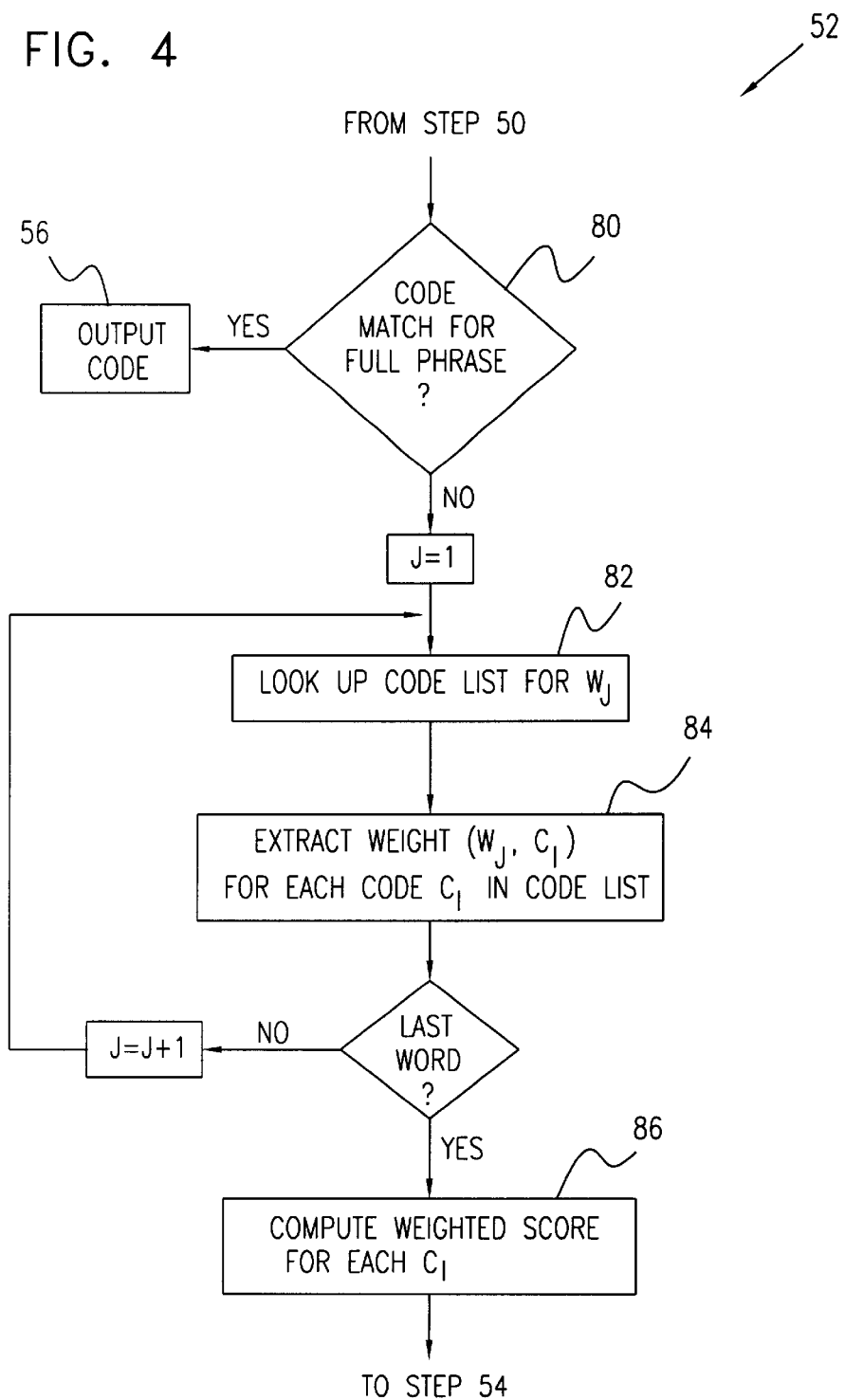

CODING SYSTEM FOR HIGH DATA VOLUME

FIELD OF THE INVENTION

The present invention relates generally to methods and systems for automated text processing, and specifically to methods for automated coding of textual data.

BACKGROUND OF THE INVENTION

The tasks involved in conducting a large-scale survey, such as a population census, generally fall into three essential stages:

Data collection, generally either by filling out paper forms or electronic data entry;

Data coding, in which data collected in free text form are converted into unambiguous codes, typically numbers or alphanumeric values; and Data analysis.

The present patent application is concerned with the coding stage. In response to a given question, such as "What is your occupation?", there are typically many different answers that can correspond to the same code. As a simple example, the responses "I drive heavy trucks" and "driver of a heavy truck" should receive the same code. A computer, however, will have a difficult time recognizing this fact. Because of such ambiguities, coding has not generally been automated up to now. The personnel engaged to perform the coding must have a high level of expertise, including familiarity with coding procedures and with a large catalog of codes that is typically provided for this purpose. For example, coders must know whether such job descriptions as "childcare worker," "babysitter," "nanny" and "playgroup assistant" fall under the same coding classification or different ones. The same coder must be capable of coding "semi-trailer driver" and "driver of a heavy truck." Because of the huge volume of data to be coded, with relatively little computer assistance, and the high level of skill that is required, the coding stage is generally the single most expensive activity in a census.

The Inference Group, of Manuka, Australia, offers a system known as "Precision Data" for automated coding of textual data. The system is described at www.inference-group.com.au. Precision Data offers two types of automated coding: automatic coding, performed by a computer strictly without human intervention, giving either one or no answer; and computer-assisted coding, wherein the computer output may be zero, one or several answers. In the latter case, a human coder must choose a code from a list suggested by the system. Precision Data is based on a coding engine, which is described as a "semi-linguistic" system. The engine parses input phrases, looks up words and other objects in a dictionary, and calculates a confidence level. The dictionary links the words to a classification index. A selection algorithm is then used to determine if there is an acceptable coding match. Coding parameters can be set to control how strict or loose a match must be in order to be acceptable. The system has a user interface with different levels of user access.

SUMMARY OF THE INVENTION

It is an object of the present invention to provide improved methods and systems for automated coding of textual data.

It is a further object of some aspects of the present invention to provide interactive methods for automated coding that make more efficient use of human coding resources.

It is still a further object of some aspects of the present invention to provide methods and systems for automatic coding of textual data with enhanced accuracy and speed.

In some preferred embodiments of the present invention, an automatic text coding system receives a collection of reference phrases along with their corresponding codes, which have been assigned by one or more human experts. After preprocessing the text to remove superfluous words and characters, the system analyzes the phrases to generate respective code lists for all of the remaining words. The code list for any given word includes the codes assigned to all of the phrases in which the word appeared. Preferably, a weight is assigned to each code in the code list, which reflects the likelihood of the code being the correct one when the given word appears in an unknown phrase. Thus, the system prepares the code lists substantially autonomously, based on coding results known to be correct.

The system subsequently uses the code lists to code further phrases whose coding is not known a priori. For each phrase, the system computes a respective cumulative matching score for each of the codes that appears in the code list of one or more of the words in the phrase. The matching score of a given code is determined by summing the weights listed for that code in the code lists of all of the words in the phrase (although the weight may be zero in some of the code lists). Preferably, the sum is weighted to account for factors such as the order of the words in the phrase. When the system finds that for a given phrase, one of the codes has a cumulative matching score much higher than the score of any other code, it unequivocally selects the code with the highest score. Furthermore, if the phrase exactly matches one of the phrases in the collection that was coded by human experts, the code assigned by the expert is preferably selected automatically.

In some preferred embodiments of the present invention, if there are a number of candidate codes for a given phrase that have roughly comparable cumulative scores, the system passes the phrase to a human specialist. Typically, multiple specialists are available, each with a particular field or fields of expertise. The system automatically chooses the most appropriate specialist, typically one who is expert in a category to which the candidate code with the highest score belongs. The system presents the human specialist with the candidate code or codes in the specialist's field of expertise. The specialist verifies or rejects the code (or indicates that he or she is unable to decide). In the case of rejection, if the next candidate code is in a different category, the phrase is passed on to another specialist with expertise in that category. The system thus makes optimal use of the human resources at its disposal, increasing the speed at which ambiguous phrases can be handled while reducing the level of training and ability required of most of the human operators.

It may also occur that the system is unable to find any codes with sufficient cumulative weights, or that there is an excessive number of codes, or that the chosen specialist (or specialists) rejected all of the candidate codes or was unable to reach a decision. In such a case, the phrase is passed to an expert human operator for manual coding. Optionally, methods of natural language processing, as are known in the art, are first applied in order to classify the field of the phrase, so that it can be routed to an operator with the appropriate field of expertise. Preferably, after the phrase has been coded, the phrase and its assigned code are added to the collection of reference phrases with known codes. The assigned code, with the appropriate weights, is then automatically added to the code lists of the words in the phrase, as described above. In this manner, the system automatically learns from the phrases that it was unable to code automatically.

Preferred embodiments of the present invention are thus based on a combination of a number of component inventive concepts. These concepts include automatic routing of phrases with suggested candidate codes to appropriately-specialized human operators, and automatic learning of codes from previously-coded text. It will be understood, however, that these inventive concepts may also be used independently of one another. Furthermore, while preferred embodiments described herein are directed to coding of text phrases, the principles of the present invention may also be applied in automated coding of data of other types. Such coding may be used, for example, in classifying images (as in automated visual inspection or sorting) or sounds. All such applications are considered to be within the scope of the present invention.

There is therefore provided, in accordance with a preferred embodiment of the present invention, a method for automated coding of a text phrase relative to a catalog of codes, including:

finding a plurality of the codes that are candidates for coding of the phrase;

identifying a category to which one or more of the candidate codes belong; and conveying the phrase together with the one or more candidate codes in the identified category to a human operator specialized in the identified category, for verification by the operator of one of the candidate codes in the category for assignment to the phrase.

Preferably, finding the plurality of the codes includes examining lists of the codes respectively associated with the words in the phrase, and selecting the candidate codes from the lists. Most preferably, the method includes providing a collection of reference phrases and codes respectively assigned to the reference phrases by a human operator, and generating the lists of the codes responsive to the words in the reference phrases, the list for each word including the codes assigned to the reference phrases containing the word.

Additionally or alternatively, each of the lists of the codes includes respective weights assigned to the codes with respect to the word with which the list is associated, and selecting the candidate codes includes computing matching scores for the codes based on the weights of the codes associated with the words in the phrase, and designating one or more of the candidate codes whose matching scores meet a predetermined criterion. Preferably, designating the candidate codes includes finding a set of one or more candidate codes whose matching scores are substantially greater than those of all of the other codes. Alternatively or additionally, when there is a single candidate code whose matching score meets the criterion, the method includes returning the single code, without conveying the phrase to the human operator.

Preferably, the method includes:

providing a collection of reference phrases and codes respectively assigned to the reference phrases by a human operator;

generating the lists of the codes responsive to the words in the reference phrases, the list for each word including the codes assigned to the reference phrases containing the word; and computing the weights to be assigned to each code in the code lists so as to indicate a likelihood of the code being the one that the human operator would assign to an unknown phrase when the given word appears in the unknown phrase.

Preferably, conveying the phrase together with the codes to the human operator includes presenting the candidate codes to the operator in a predetermined sequence and receiving a binary input from the operator to verify or reject the codes in the sequence. Most preferably, when the operator is unable to verify any of the candidate codes, the method includes passing the phrase to an expert operator for manual coding.

Further preferably, when a single one of the candidate codes meets a predetermined matching criterion, while none of the other candidate codes meets the criterion, returning the single code, without conveying the phrase to the human operator.

There is also provided, in accordance with a preferred embodiment of the present invention, a method for automated coding of text phrases made up of words, the method including:

providing a collection of reference phrases and codes respectively assigned to the reference phrases by one or more human operators;

generating for the words in the reference phrases respective lists of the codes, the list for each word including the codes assigned to the reference phrases containing the word;

receiving an input phrase to which a code is to be assigned; and processing the input phrase using the lists of codes so as to determine whether one or more candidate codes, selected from the lists, meet a criterion for assignment to the phrase.

Preferably, the input phrase includes first and second input phrases, and the method includes, if the candidate codes do not meet the criterion with respect to the first input phrase, passing the first input phrase to one of the human operators for assignment of a code to the first input phrase, and repeating the step of generating the lists of codes using the words in the first input phrase, wherein processing the input phrase includes processing the second input phrase using the lists of codes generated using the words in the first input phrase.

Preferably, generating the lists of the codes includes assigning respective weights to the codes in each list with respect to the word with which the list is associated, and processing the input phrase includes computing matching scores for the codes based on the weights of the codes associated with the words in the phrase, and designating a set of one or more of the candidate codes whose matching scores meet a predetermined criterion.

Preferably, processing the input phrase includes:

when the set of one or more candidate codes includes a single code meeting the criterion, returning the single code; and when the set of one or more candidate codes does not include a single code meeting the criterion, routing the phrase to a human operator for coding.

There is further provided, in accordance with a preferred embodiment of the present invention, apparatus for automated coding of a text phrase relative to a catalog of codes, including:

a plurality of coding workstations, adapted to be operated by human operators having respective fields of specialization; and a coding server, coupled to communicate with the workstations, and operative to find a plurality of the codes that are candidates for coding of the phrase, to identify a category to which one or more of the candidate codes belong, and to convey the phrase together with the one or more candidate codes in the identified category to one of the workstations that is operated by one of the human operators whose field of specialization includes the identified category, for verification by the operator of one of the candidate codes in the category for assignment to the phrase.

There is additionally provided, in accordance with a preferred embodiment of the present invention, apparatus for automated coding of text phrases made up of words, the apparatus including a coding server, adapted to receive a collection of reference phrases and codes respectively assigned to the reference phrases by one or more human operators, to generate for the words in the reference phrases respective lists of the codes, the list for each word including the codes assigned to the reference phrases containing the word, to receive an input phrase to which a code is to be assigned, and to process the input phrase using the lists of codes so as to determine whether one or more candidate codes, selected from the lists, meet a criterion for assignment to the phrase.

Preferably, the apparatus includes one or more coding workstations, in communication with the server and adapted to be operated by the human operators.

There is moreover provided, in accordance with a preferred embodiment of the present invention, a computer software product for automated coding of a text phrase relative to a catalog of codes, including a computer-readable medium in which program instructions are stored, which instructions, when read by a computer, cause the computer to find a plurality of the codes that are candidates for coding of the phrase, to identify a category to which one or more of the candidate codes belong, and to convey the phrase together with the one or more candidate codes in the identified category to a human operator specialized in the identified category, for verification by the operator of one of the candidate There is furthermore provided, in accordance with a preferred embodiment of the present invention, a computer software product for automated coding of text phrases made up of words, the product including a computer-readable medium in which program instructions are stored, which instructions, when read by a computer, cause the computer, upon receiving a collection of reference phrases and codes respectively assigned to the reference phrases by one or more human operators, to generate for the words in the reference phrases respective lists of the codes, the list for each word including the codes assigned to the reference phrases containing the word, and upon further receiving an input phrase to which no code has yet been assigned, to process the input phrase using the lists of codes so as to determine whether one or more candidate codes, selected from the lists, meet a criterion for assignment to the phrase.

The present invention will be more fully understood from the following detailed description of the preferred embodiments thereof, taken together with the drawings in which:

BRIEF DESCRIPTION OF THE DRAWINGS

FIG. 4 is a flow chart that schematically illustrates a method for automatically finding and evaluating candidate codes corresponding to a text phrase, in accordance with a preferred embodiment of the present invention.

DETAILED DESCRIPTION OF PREFERRED EMBODIMENTS

Figure 1:
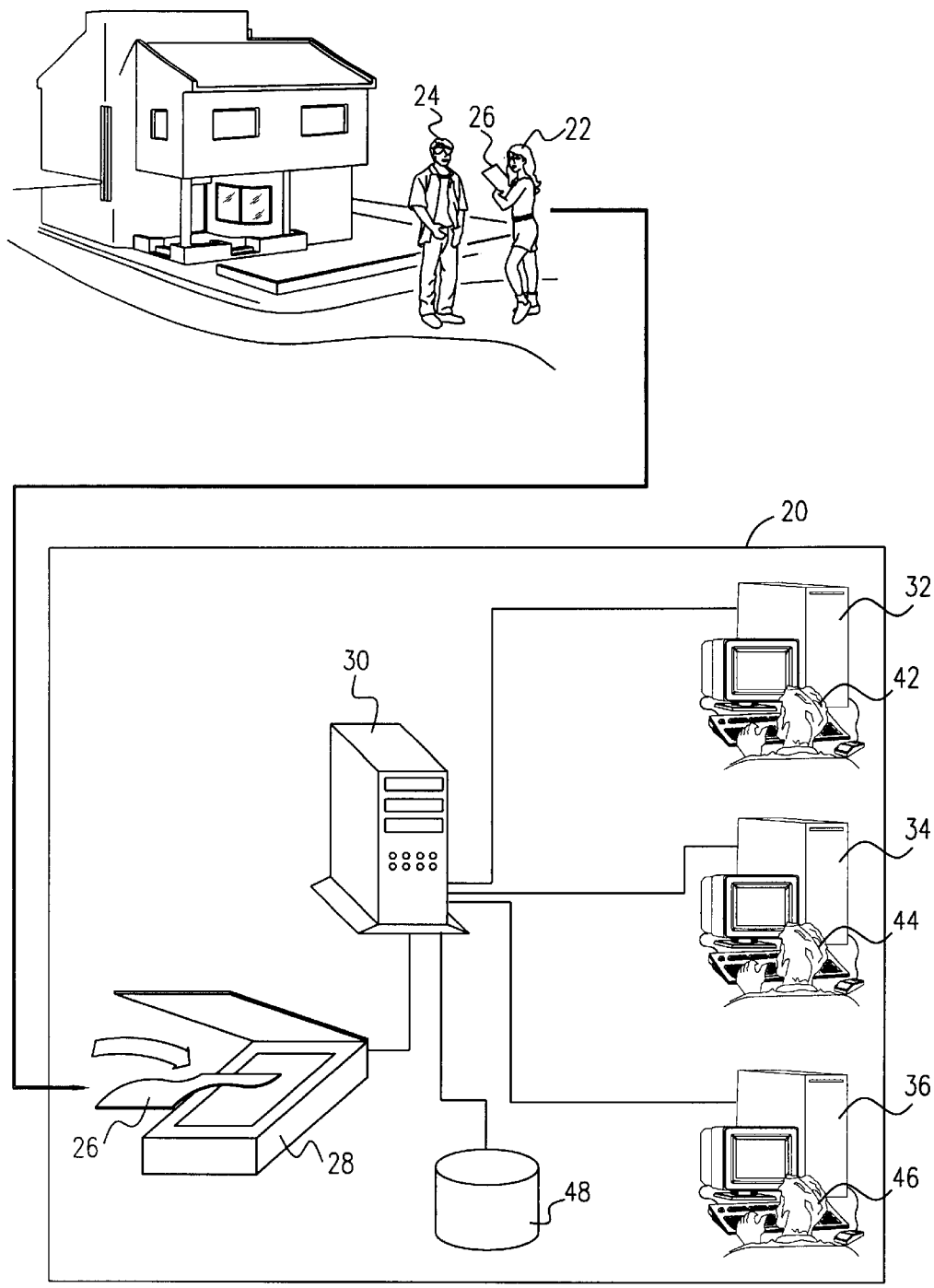
FIG. 1 is a schematic, pictorial illustration of a system for automated collection and coding of textual data, in accordance with a preferred embodiment of the present invention.

FIG. 1 is a schematic, pictorial illustration of a system 20 for automated collection and coding of textual data, in accordance with a preferred embodiment of the present invention. For the sake of illustration, the system is described herein with reference to collection and coding of census data, but it may be used in substantially any application in which large volumes of textual data must be coded. In the present example, a census taker 22 questions a subject 24 and records the subject's responses on a recording medium 26. Here the medium is shown as a paper form, which is then scanned into system by a scanner 28. Alternatively, the textual data may be input electronically, such as via a remote electronic data logger or via a network. System 20 can also be used to process stored data, which are recalled from a storage device 48, for example.

A coding server 30 processes the textual data so as to assign appropriate codes to the subject's free text responses. In a census, for example, these responses may comprises a description of the subject's occupation, educational background or leisure pursuits. If necessary, the server converts written or typed responses on medium 26 to alphanumeric text characters, using methods of optical character recognition (OCR) known in the art. Optionally, the OCR results are reviewed and corrected automatically and/or by a human operator before coding. Server 30 then attempts to assign a code, or a number of candidate codes, to each response, using automatic coding methods described hereinbelow. The server selects the codes from a categorized catalog of codes, such as codes identifying different occupations. For example, the catalog may include the general occupational category of "motor vehicle driver," with specific codes for "taxi driver," "bus driver," "heavy truck driver," etc.

When server 30 is unable to find a single, unequivocal code for a phrase or sentence given as a response to some question, it passes the response to one of a plurality of workstations 32, 34, 36. (Such a response is referred to hereinafter as "ambiguous.") The workstations may be located in the same facility as the server, or alternatively they may be remotely located, communicating with the server over a network, for example. Each of the workstations is run by a human operator 42, 44, 46, respectively. Preferably, each operator is specialized in a particular coding domain. For example, operator 42 may specialize in medical and technological occupations, operator 44 in office- and service-related occupations, and operator 46 in civil engineering and farming. Furthermore, one or more of the operators at a higher grade may be particularly expert in a group of domains or in the structure of the code catalog generally. Server 30 maintains a record of the fields of expertise of the operators using the different workstations, and distributes the ambiguous responses accordingly, as described in detail hereinbelow.

Server 30 and workstations 32, 34, 36 preferably comprise general-purpose computers, which may be of any suitable type known in the art. The computers are programmed with appropriate software for carrying out the methods of the present invention. The software may be downloaded to the computers in electronic form, over a network, for example, or it may be provided on tangible media, such as CD-ROM or non-volatile memory, for installation in the computers. Alternatively, the server and workstations may comprise special-purpose, dedicated hardware or a combination of dedicated and general-purpose components.

Figure 2:
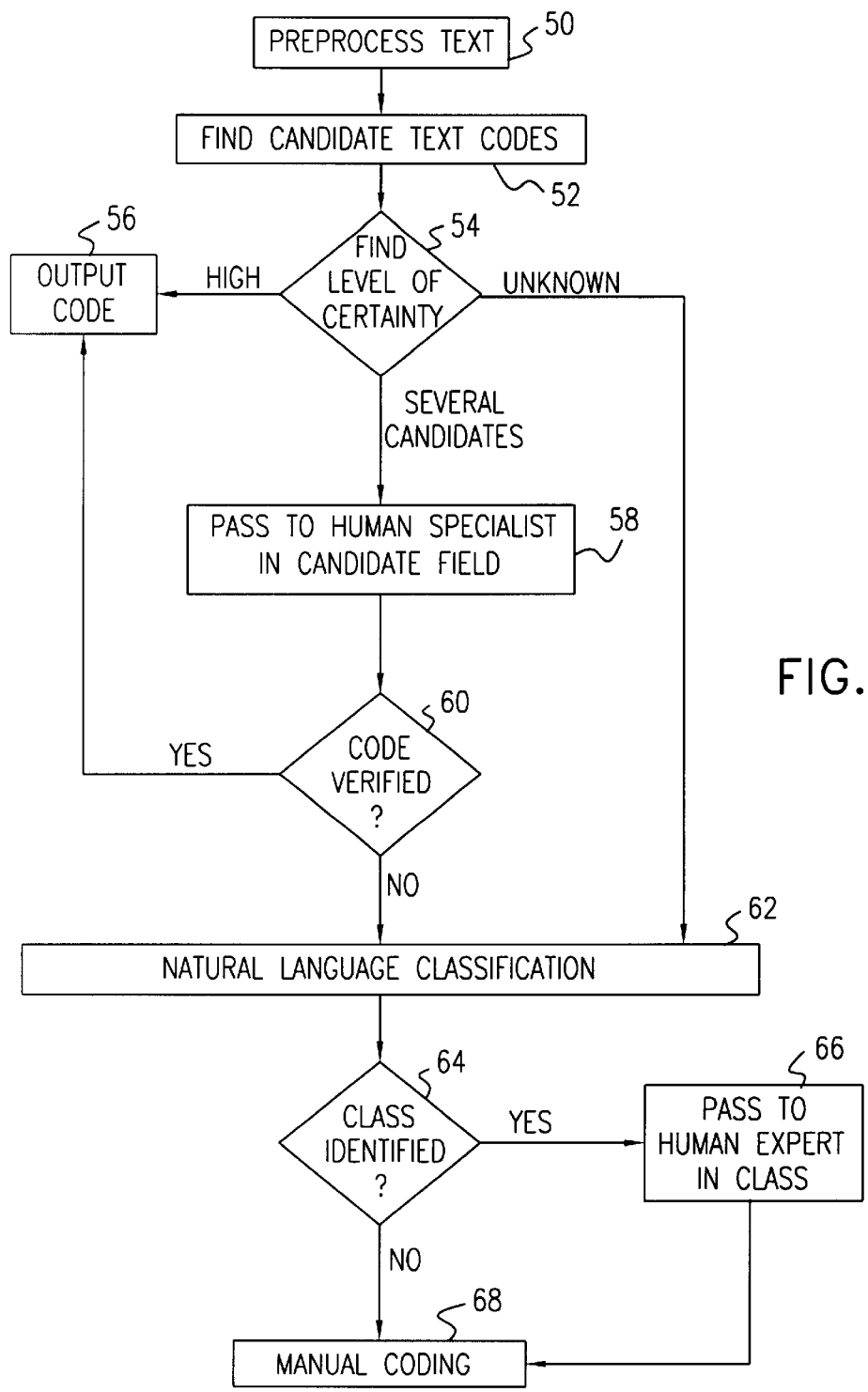
FIG. 2 is a flow chart that schematically illustrates a method for automated coding of textual data, in accordance with a preferred embodiment of the present invention.

FIG. 2 is a flow chart that schematically illustrates a method for automated processing of text responses in system 20, in accordance with a preferred embodiment of the present invention. Each such response comprises a phrase, made up of one or more words. The phrase is generally input to the system without restriction as to the choice of words or syntax used by the respondent, and it may or may not constitute a complete sentence (or it may even include more than one sentence). Thus, the phrase may also include spelling errors and "dross" words that are superfluous and even misleading in coding of the text. Such dross words, such as the phrase "I used to," generally add nothing to the coding content but may confuse the coding steps that follow. Therefore, at a preprocessing step 50, steps are taken to circumvent these problems.

Preferably, preprocessing step 50 includes at least two operations:

Removal of vowels, particularly a, e and o, from all but the first position in all of the words.

Double letters are preferably reduced to single, as well. This step reduces the impact of spelling errors in subsequent automated coding.

Removal of dross words. For example, in coding of occupations, it has been found useful to eliminate the following words: I, a, and, 1, 2, 3, was, the, for, of, on, at, kinds, all, working, with, various, things, etc., retired, see, above, same, as, in, laid, off.

After preprocessing, server 30 attempts to find one or more candidate codes, at an automatic coding step 52. The codes are found by looking up the words of the phrase in a dictionary of words stored in the server or in storage device 48. (The words in the dictionary are preprocessed in the same manner as are the words in the phrase.) For each word in the dictionary, there is a list of candidate codes that may correspond to an input phrase that includes this word. The list preferably includes a weight assigned to each code reflecting the likelihood that this is the correct code for a phrase containing this word. Based on these weights, server 30 computes a cumulative matching score for each of the codes that appears in the code list of one or more of the words in the phrase. Typically, if there is some code that is a close match to the phrase, this code will appear in the code lists of two or more of the words in the phrase and will therefore have a high matching score. Methods for automatically building the code lists and computing the weights and matching scores are described in detail hereinbelow.

Preferably, the server also compares the entire phrase to a dictionary of the known reference phrases with their corresponding codes. If an input phrase exactly matches one of the known phrases, then the corresponding code must also be the correct code for the input phrase.

At a candidate assessment step 54, server 30 examines the candidate codes that it has found in order to determine the next step to be taken in processing the input phrase. If an exact match has been found to the phrase, or if one of the candidate codes has a substantially higher matching score than any of the others, there is then a high level of certainty that this code is correct. Therefore, server 30 outputs this single code selected for the phrase at an output code step 56. Typically the selected code is stored in a database, in storage device 48, for example, for subsequent data analysis or other processing. There may also be input phrases for which there is no specific code, for example, if the response given to the question of occupation was simply "driver." The server preferably recognizes phrases and words of this type at step 52, and when they occur, it records the response at step 56 as being uncodable.

On the other hand, it may occur at step 54 that there are a number of codes whose matching scores are roughly comparable, so that it is not possible to make an unequivocal automatic choice of one of them. The threshold criteria for what constitutes an unequivocal choice, in terms of both absolute matching score and margin relative to matching scores of other candidates, are preferably set in accordance with application requirements. Typically, setting low thresholds increases the throughput of system 20, since it allows server 30 to code a relatively greater portion of the input phrases fully automatically. The enhanced throughput may come at the expense of reduced accuracy, however, since the more relaxed the threshold criteria, the greater are the chances that the automatic selection will be incorrect.

When there are a number of codes with roughly comparable matching scores, server 30 passes the corresponding phrase to one of workstations 32, 34, 36, at a pass-on step 58. The server chooses which workstation is to receive the phrase based on the known areas of specialization of operators 42, 44, 46. The specialist is chosen based on his or her expertise in a category to which one or more of the codes found by the server belong. Typically, the server chooses the category of the candidate code with the highest score. The server compares the code category to a list of operator specializations and their workstation addresses, and routes the phrase accordingly to the appropriate operator. Optionally, the server evaluates all of the codes to determine whether a number of them belong to a common category, and chooses a specialist who is expert in that category, even if it does not include the candidate code with the highest score.

At a verification step 60, the operator is presented with the candidate code or codes that are in his or her field of expertise. Preferably, the phrase is presented to the operator along with each of the codes in turn, most preferably in descending order of the matching scores. For each code, the operator has the choice of inputting "accept," "reject" or "pass on" (unable to decide). Whenever the operator rejects a code, the next code in turn is presented, as long as it is also in the operator's field of expertise. As soon as the operator has accepted a code, that code is output at step 56. The remaining codes for the phrase are then discarded without further consideration. If the operator rejects all of the codes, but there are still candidate codes in a different category, the phrase is preferably passed to another operator who is expert in that category. If none of the codes are accepted by the appropriate specialist operators, or if an operator chooses "pass on," to indicate that he or she is incapable of deciding on this phrase, the phrase is passed on to the next stage of processing.

This next stage may be carried out by a more expert human operator, or else additional computer processing may be invoked. In the latter case, server 30 preferably applies natural language processing techniques to the phrase, as are known in the art, in a language processing step 62. Such techniques are generally more computation-intensive and time-consuming than the automatic coding performed at step 52, and they are therefore reserved for phrases for which a suitable code was not found at step 60. Likewise, at step 54, if server 30 is unable to find any codes with matching scores above a minimum threshold, or if too many different codes are found, the phrase is preferably passed to step 62.

At a class identification step 64, the server uses the results of step 62 in an attempt to assign the phrase to some known class or category. If the server is able to make such an assignment, and there is a human operator in system 20 who is expert in this class, then the phrase is passed to that expert, in an expert assignment step 66. The expert then assigns a code to the phrase, in a manual coding step 68, by choosing the appropriate code from the catalog. If there is no particular expert available in the class, or if step 64 is unsuccessful, and no class is identified, then the phrase is passed to a general coding expert for manual coding. The results of manual coding step 68 are preferably used in updating the dictionary and code lists used in subsequent automatic processing, as described hereinbelow.

Figure 3:
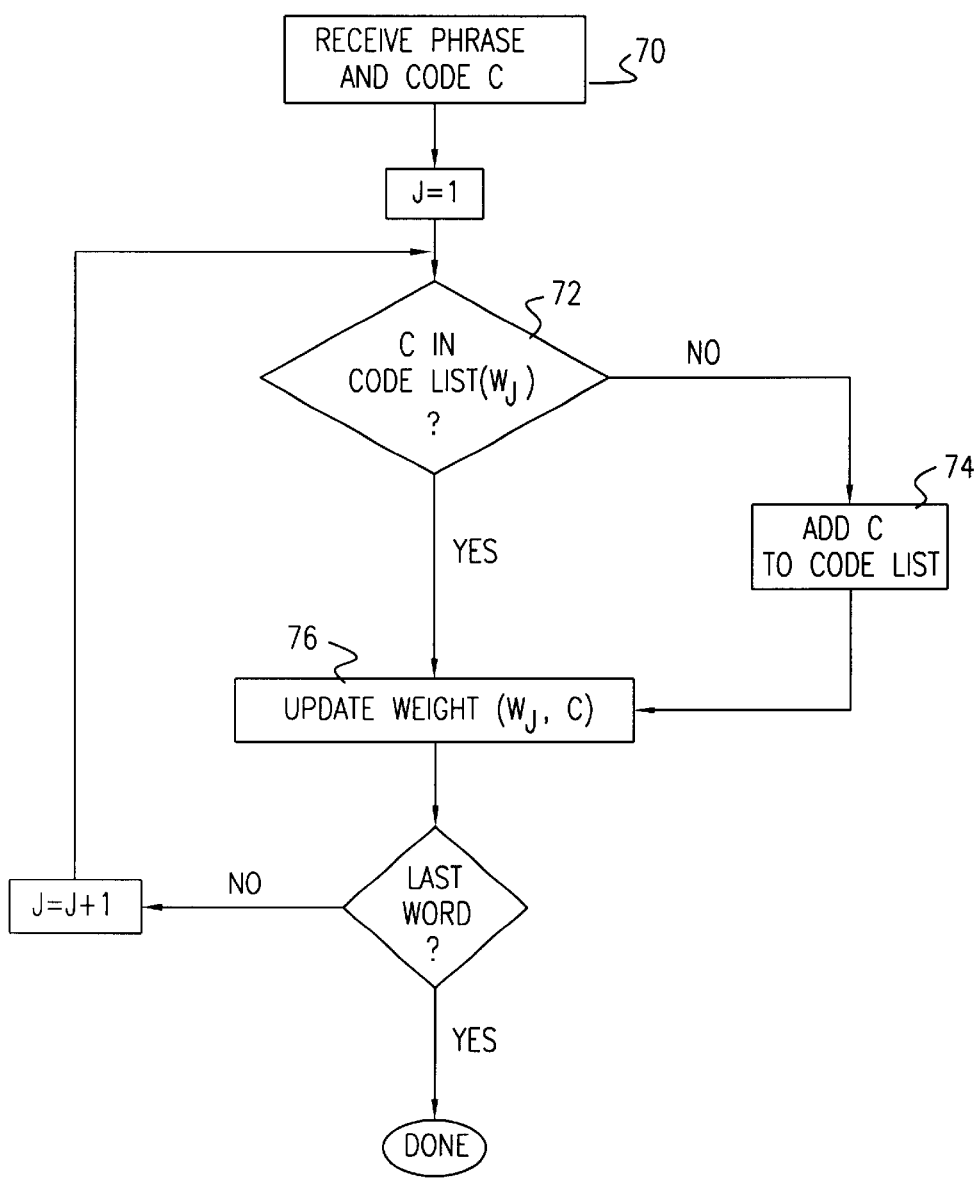
FIG. 3 is a flow chart that schematically illustrates a method for automatic generation of code lists for use in automated data coding, in accordance with a preferred embodiment of the present invention.

FIG. 3 is a flow chart that schematically illustrates a "learning" process, by means of which server 30 automatically generates the dictionary and code lists for use in automated data coding, in accordance with a preferred embodiment of the present invention. The process is based on a collection of reference phrases that have been authoritatively coded by human experts. Optionally, the same phrases are reviewed and coded multiple times, by a number of different experts. If the experts disagree on any particular phrase, the code that was assigned to the phrase by the majority of the experts is the one that is used. As noted above, the collection of phrases is augmented from time to time with additional phrases that could not be successfully coded by the automated process of FIG. 2.

The learning process begins at a phrase input step 70, wherein server 30 receives a new phrase and its assigned code C. The phrase is preprocessed, as described above with reference to step 50. Each of the words $W_j$ remaining in the phrase after preprocessing is then considered in turn. At a check code list step 72, the current list of codes belonging to the first word in the phrase, $W_1$, is checked to determine whether code C is already found in the list. If not, then at a code addition step 74, C is added to the code list for this word. At a weight updating step 76, the weight of code C in this code list is recorded. If C was just added to the code list, it receives a weight of 1/N, wherein N is the number of words in the current reference phrase. Otherwise, if C already exists in this code list, the new weight to be assigned to C is the maximum of 1/N and its current weight. Steps 72 through 76 are repeated for all of the words in the reference phrase.

FIG. 4 is a flow chart that schematically illustrates details of automatic coding step 52, in accordance with a preferred embodiment of the present invention. At a full phrase matching step 80, the current phrase is checked against the collection of reference phrases, as mentioned above. If an exact match is found, the code that was assigned to the reference phrase by the expert human coder is immediately output, at step 56, and the coding process for this phrase is finished. Otherwise, server 30 proceeds to process each of the words $W_j$ of the current phrase in turn.

At a code list lookup step 82, the server retrieves the code list for the first word $W_1$ in the phrase. Typically, the list includes multiple different codes $C_j$, each with a respective weight. These weights are extracted from the code list, at a weight extraction step 84, and are preferably held in a table while steps 82 and 84 are repeated for all of the words in the phrase. Some of the codes may appear in the code lists of multiple words, while others may appear in the code list of only one of the words. Table I below presents the table generated for a typical phrase four words in length:

TABLE I

|    | W1  | W2  | W3  | W4  | Score |
|----|-----|-----|-----|-----|-------|
| C1 | 0.3 | —   | 0.2 | —   | 0.8   |
| C2 | 0.2 | 0.2 | 0.2 | 0.2 | 1.1   |
| C3 | —   | —   | —   | 0.5 | 0.5   |
| ...|     |     |     |     |       |

As seen in the table, code C1 appears in the code lists of the first and third words of the phrase, with respective weights of 0.3 and 0.2. Code C2 appears in the code lists of all of the words with equal weights, while code C3 appears only in the code list of the last word.

At a scoring step 86, the cumulative matching scores of the codes in the table are computed, as shown in the last column of the table above. Preferably, the matching score for each code is a weighted sum of the individual weights for that code. Most preferably, the sum gives greater weight to words near the beginning of the phrase. Therefore, in the example shown in the table, the weights of the codes associated with word W1 are multiplied by 2 before summing, and the weights associated with word W2 are multiplied by 1.5. Optionally, the matching score for a given code may be reduced if the code is absent from the code lists of one or more of the words. The matching scores are then passed to step 54 in order to determine the next step to be taken in processing.

It will be understood that the methods and principles of automated coding and routing of phrases to appropriately-specialized human operators, as described above, may be carried out independently of the code learning process described with reference to FIG. 3. By the same token, the methods and principles described above for automatic learning of codes from previously-coded text may similarly be applied even when automated routing is absent. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for automated coding of a text phrase relative to a catalog of codes, comprising:

finding a plurality of the codes that are candidates for coding of the phrase;

identifying a category to which one or more of the candidate codes belong;

selecting a human operator specialized in the identified category; and conveying the phrase together with the one or more candidate codes in the identified category to the selected human operator, for verification by the operator of one of the candidate codes in the category for assignment to the phrase.

2. A method according to claim 1, wherein finding the plurality of the codes comprises examining lists of the codes respectively associated with the words in the phrase, and selecting the candidate codes from the lists.

3. A method according to claim 2, and comprising:

providing a collection of reference phrases and codes respectively assigned to the reference phrases by a human operator; and generating the lists of the codes responsive to the words in the reference phrases, the list for each word comprising the codes assigned to the reference phrases containing the word.

4. A method according to claim 2, wherein each of the lists of the codes comprises respective weights assigned to the codes with respect to the word with which the list is associated, and wherein selecting the candidate codes comprises computing matching scores for the codes based on the weights of the codes associated with the words in the phrase, and designating one or more of the candidate codes whose matching scores meet a predetermined criterion.

5. A method according to claim 4, wherein designating the candidate codes comprises finding a set of one or more candidate codes whose matching scores are substantially greater than those of all of the other codes.

6. A method according to claim 4, wherein when there is a single candidate code whose matching score meets the criterion, the method comprises returning the single code, without conveying the phrase to the human operator.

7. A method according to claim 4, and comprising:
providing a collection of reference phrases and codes respectively assigned to the reference phrases by a human operator;
generating the lists of the codes responsive to the words in the reference phrases, the list for each word comprising the codes assigned to the reference phrases containing the word; and
computing the weights to be assigned to each code in the code lists so as to indicate a likelihood of the code being the one that the human operator would assign to an unknown phrase when the given word appears in the unknown phrase.

8. A method according to claim 1, wherein conveying the phrase together with the codes to the human operator comprises presenting the candidate codes to the operator in a predetermined sequence and receiving a binary input from the operator to verify or reject the codes in the sequence.

9. A method according to claim 8, and comprising, when the operator is unable to verify any of the candidate codes, passing the phrase to an expert operator for manual coding.

10. A method according to claim 1, and comprising, when a single one of the candidate codes meets a predetermined matching criterion, while none of the other candidate codes meets the criterion, returning the single code, without conveying the phrase to the human operator.

11. A method for automated coding of text phrases made up of words, the method comprising:
providing a collection of reference phrases and codes respectively assigned to the reference phrases by one or more human operators;
generating for the words in the reference phrases respective lists of the codes, the list for each word comprising the codes assigned to the reference phrases containing the word;
receiving an input phrase to which a code is to be assigned;
processing the input phrase using the lists of codes so as to determine whether one or more candidate codes, selected from the lists, meet a criterion for assignment to the phrase; and
if one of the selected candidate codes meets the criterion, making a record indicative of the assignment of the one of the selected candidate codes to the phrase.

12. A method according to claim 11, wherein the input phrase comprises first and second input phrases, and wherein the method comprises, if the candidate codes do not meet the criterion with respect to the first input phrase, passing the first input phrase to one of the human operators for assignment of a code to the first input phrase, and repeating the step of generating the lists of codes using the words in the first input phrase, and
wherein processing the input phrase comprises processing the second input phrase using the lists of codes generated using the words in the first input phrase.

13. A method according to claim 11, wherein generating the lists of the codes comprises assigning respective weights to the codes in each list with respect to the word with which the list is associated, and
wherein processing the input phrase comprises computing matching scores for the codes based on the weights of the codes associated with the words in the phrase, and designating a set of one or more of the candidate codes whose matching scores meet a predetermined criterion.

14. A method according to claim 13, wherein designating the set of candidate codes comprises finding one or more candidate codes whose matching scores are substantially greater than those of all of the other codes.

15. A method according to claim 13, wherein processing the input phrase comprises:
when the set of one or more candidate codes comprises a single code meeting the criterion, returning the single code; and
when the set of one or more candidate codes does not comprise a single code meeting the criterion, routing the phrase to a human operator for coding.

16. A method according to claim 13, wherein assigning the respective weights to the codes comprises computing the weights to be assigned to each code in the code lists so as to indicate a likelihood of the code being the one that the human operator would assign to an unknown phrase when the given word appears in the unknown phrase.

17. Apparatus for automated coding of a text phrase relative to a catalog of codes, comprising:
a plurality of coding workstations, adapted to be operated by human operators having respective fields of specialization; and
a coding server, coupled to communicate with the workstations, and operative to find a plurality of the codes that are candidates for coding of the phrase, to identify a category to which one or more of the candidate codes belong, and to convey the phrase together with the one or more candidate codes in the identified category to one of the workstations that is operated by one of the human operators whose field of specialization includes the identified category, for verification by the operator of one of the candidate codes in the category for assignment to the phrase.

18. Apparatus according to claim 17, wherein the server is adapted to receive a collection of reference phrases and codes respectively assigned to the reference phrases by one or more of the human operators, and to generate lists of the codes corresponding to the words in the reference phrases, the list for each word comprising the codes assigned to the reference phrases containing the word, and
wherein the server is operative to find the candidate codes by selecting the candidate codes from the lists of the codes respectively associated with the words in the phrase.

19. Apparatus according to claim 17, wherein when a single one of the candidate codes meets a predetermined matching criterion, while none of the other candidate codes meets the criterion, the server is operative to return the single code, without conveying the phrase to the workstation.

20. Apparatus according to claim 17, wherein the phrase together with the codes are presented to the human operator in a predetermined sequence, and the workstation is adapted to receive a binary input from the operator to verify or reject the codes in the sequence.

21. Apparatus according to claim 20, wherein when the operator is unable to verify any of the candidate codes, the server passes the phrase to an expert operator for manual coding.

22. Apparatus for automated coding of text phrases made up of words, the apparatus comprising a coding server, adapted to receive a collection of reference phrases and codes respectively assigned to the reference phrases by one or more human operators, to generate for the words in the reference phrases respective lists of the codes, the list for each word comprising the codes assigned to the reference phrases containing the word, to receive an input phrase to which a code is to be assigned, and to process the input phrase using the lists of codes so as to determine whether one or more candidate codes, selected from the lists, meet a criterion for assignment to the phrase.

23. Apparatus according to claim 22, and comprising a coding workstation, in communication with the server and adapted to be operated by one of the human operators, wherein the input phrase comprises first and second input phrases, and wherein if the candidate codes do not meet the criterion with respect to the first input phrase, the server is adapted to pass the first input phrase to the workstation for assignment of a code to the first input phrase by the human operator, and wherein responsive to the assignment of the code by the human operator, the server is operative to regenerate at least some of the lists of codes using the words in the first input phrase, and to process the second input phrase using the regenerated lists of codes.

24. Apparatus according to claim 22, and comprising one or more coding workstations, in communication with the server and adapted to be operated by the human operators, wherein when the one or more candidate codes comprise a single code meeting the criterion for assignment to the phrase, the server is adapted to return the single code, whereas when the set of one or more candidate codes does not comprise a single code meeting the criterion, the server is adapted to route the phrase to one of the human operators for coding.

25. A computer software product for automated coding of a text phrase relative to a catalog of codes, comprising a computer-readable medium in which program instructions are stored, which instructions, when read by a computer, cause the computer to find a plurality of the codes that are candidates for coding of the phrase, to identify a category to which one or more of the candidate codes belong, to select a human operator specialized in the identified category, and to convey the phrase together with the one or more candidate codes in the identified category to the selected human operator, for verification by the operator of one of the candidate codes in the category for assignment to the phrase.

26. A computer software product for automated coding of text phrases made up of words, the product comprising a computer-readable medium in which program instructions are stored, which instructions, when read by a computer, cause the computer, upon receiving a collection of reference phrases and codes respectively assigned to the reference phrases by one or more human operators, to generate for the words in the reference phrases respective lists of the codes, the list for each word comprising the codes assigned to the reference phrases containing the word, and upon further receiving an input phrase to which no code has yet been assigned, to process the input phrase using the lists of codes so as to determine whether one or more candidate codes, selected from the lists, meet a criterion for assignment to the phrase.

* * * * *